United States Patent [19]

Johnson, Jr.

[11] 4,404,516

[45] Sep. 13, 1983

[54] SYSTEM FOR DETECTING LEAKS FROM LIQUID-CONTAINING RESERVOIRS AND CONDUITS

[76] Inventor: Victor R. Johnson, Jr., 2214 Villa Creek Dr., Kingwood, Tex. 77339

[21] Appl. No.: 298,414

[22] Filed: Sep. 1, 1981

Related U.S. Application Data

[63] Continuation-in-part of Ser. No. 201,841, Oct. 29, 1980, abandoned, which is a continuation of Ser. No. 180,724, Aug. 25, 1980, abandoned.

[51] Int. Cl.³ .................. G01R 31/08; G01R 31/12; G01M 3/16
[52] U.S. Cl. .................. 324/54; 73/40.5 R; 324/52; 324/65 R; 340/605
[58] Field of Search .................. 324/51, 52, 54, 65 R, 324/71 R, 140 R; 340/605; 73/40.5 R; 405/54

[56] References Cited

U.S. PATENT DOCUMENTS

| | | | |
|---|---|---|---|
| 3,197,698 | 7/1965 | Schaschl et al. | 324/71 R X |
| 3,252,155 | 5/1966 | Surtees et al. | 324/54 X |
| 3,365,661 | 1/1968 | Zimmerman | 324/52 |
| 3,383,863 | 5/1968 | Berry | 324/65 R |
| 3,564,526 | 2/1971 | Butts | 324/52 UX |
| 3,600,674 | 8/1971 | Roberts | 324/52 |
| 3,721,898 | 3/1973 | Dragoumis et al. | 324/65 R |
| 3,728,615 | 4/1973 | Hill et al. | 324/140 R X |
| 4,095,174 | 6/1978 | Ishido | 324/52 |
| 4,107,672 | 8/1978 | van Riemsdijk et al. | 340/605 |
| 4,159,447 | 6/1979 | Gernhardt et al. | 324/51 |
| 4,206,632 | 1/1980 | Suzuki | 324/52 X |
| 4,305,724 | 12/1981 | Micko | 324/71 R |

FOREIGN PATENT DOCUMENTS 2425636  1/1980  France .................. 73/40.5 R Primary Examiner—Gerard R. Strecker
Attorney, Agent, or Firm—Sughrue, Mion, Zinn

[57] ABSTRACT

A leak detection and location system is disclosed for chemical storage ponds, conduits and tanks containing environmentally harmful materials. The leak detection system comprises a network of electrically conductive wires placed directly under the reservoir or conduit. The wires are so constructed that should a leak occur, chemicals which escape will corrode the wires or, alternatively, degrade the insulation around the wires, thereby causing a change in the electrical properties of the wires. By detecting the change in electrical properties for each wire affected, the leak can be detected and localized in two dimensions.

18 Claims, 3 Drawing Figures

SYSTEM FOR DETECTING LEAKS FROM LIQUID-CONTAINING RESERVOIRS AND CONDUITS

CROSS-REFERENCE TO RELATED APPLICATION

This application is a continuation-in-part of U.S. application Ser. No. 201,841, filed Oct. 29, 1980, now abandoned, which is a continuation of U.S. application Ser. No. 180,724, filed Aug. 25, 1980, now abandoned.

BACKGROUND OF THE INVENTION

1. Field of the Invention

The present invention relates generally to a leak detection and location system for chemical storage reservoirs, tanks and conduits containing environmentally harmful materials.

2. Description of the Prior Art

Environmentally harmful materials, such as chemical wastes, are sometimes stored in man-made waste chemical disposal ponds or waste tanks. These containers are generally lined with an impermeable synthetic polymer sheet that prevents the waste chemicals from corroding the tank or contaminating the ground water. Also, pipes and other types of conduits used to transport corrosive chemicals may be similarly lined. One of the problems that has hampered the safe storage and transportation of chemicals in this fashion is that the lining of the pond, tank or conduit can develop leaks and, before the leak can be detected, release harmful materials to pollute the earth and ground water.

In the past, several methods have been devised to detect leaks from chemical waste reservoirs, storage tanks and conduits. For example, bored monitored wells that extend down in the earth to the water table have been used to detect leaks from chemical ponds and subterranean storage tanks. However, this procedure is only suitable for detecting long-term contamination and in some cases there has been substantial contamination of the ground water before the need for corrective action is recognized. Lysimeters have been used as an alternative method of detecting chemical leaks but without much reliability. They tend to clog and break down mechanically and are only capable of extracting test samples in very localized areas.

An alternative method of detecting leaks from waste disposal ponds is disclosed in U.S. Pat. No. 3,252,155, Surtees & Benard, in which the exterior synthetic polymer lining is lined with an electrically conductive metal foil. This method for detecting leaks while the chemicals are stored in the pond requires that the chemicals be electrically conductive. Leaks in the lining are detected by placing one electrical lead on the metal foil and another electrical lead in the chemical stored in the pond, and then connecting these leads to a power source. When a leak occurs in the non-electrically conductive synthetic polymer lining, the electrically conductive waste material contacts the metal foil and completes an electrical circuit that triggers an alarm. When electrically non-conductive materials are stored in the pond, defects in the lining can only be detected when the pond is empty by connecting the metal foil with an electrical lead, placing a second electrical lead in contact with a sponge containing an electrolyte, connecting the two leads to a power source, and tracing the entire liner surface with the sponge. Then when the sponge comes in contact with a defect in the lining, the electrolyte penetrates the lining and completes an electrical circuit, again triggering an alarm.

Another method devised for detecting leaks from subterranean chemical tanks is to place a cured polyester resin sheet on the ground directly beneath the storage tank. The resin sheet is constructed with a drainage system such that leaks from the tank can be detected by inspecting a convenient portion of the drainage system where the fluid will ultimately flow.

A method for detecting leaks from reservoirs containing the waste salt water which is a by-product of petroleum production is disclosed in U.S. Pat. No. 3,383,863, Berry. According to Berry, a salt-water reservoir, e.g., an earthen pit, can be lined with a resin-coated pad of corrugated cardboard, heavy kraft paper or some foamed material. A grid of parallel wires is placed beneath the pad, which grid may be separated by a layer of dry earth from a second, similar grid arranged so that its wires run at cross-angles to the wires of the first grid. Alternatively, the second grid may run within the pad itself. Berry teaches that when a break develops in the pad, the leaking salt water will establish a low-resistance shunt between one or more wires of the first grid and at least one wire of the second grid. As a result, a circuit is completed between the previously isolated grids by the leak, which, according to Berry, can be localized in two dimensions beneath the pad by attempting to pass current through successive pairs of wires in the two grids.

The method for leak detection disclosed by Berry is dependent upon the formation by a leaking electrolytic fluid of a short-circuit across some barrier separating the two grids, at least one of which is in contact with the soil beneath the lined reservoir. Consequently, this approach requires that the soil under the reservoir remain dry, since it is the wetting of the soil by the leaking fluid that completes the circuit, thereby permitting the detection of a change in electrical resistance between the grids. Since soil under reservoirs, tanks and the like is usually moist in most parts of North America for at least part of the year, the method of Berry is not practical in many situations, and therefore has not been utilized commercially to any significant extent.

U.S. Pat. No. 3,564,526, Butts, teaches a technique for detecting leaks in buried pipelines which operates on a principle similar to that disclosed by Berry. In accordance with Butts, a pair of conductors are positioned beneath the buried pipe and separated by an insulation which is degradable by the fluid, such as crude oil, contained in the pipe. When a leak occurs, the insulation is broken down and a short-circuit is established between the two conductors. As in the method of Berry, the leak would be detected according to Butts by passing current through the newly completed circuit.

U.S. Pat. No. 4,107,672, Van Riemsdijk et al, discloses a method for detecting leaks in the heat-insulating lining of a container for cold liquids like liquefied natural gas, whereby a plurality of frangible electrical conductors are incorporated into the heat-insulating lining of woven glass fiber. According to Van Riemsdijk et al, when a crack develops in the lining, one or more of the conductors is broken, triggering an alarm. Van Riemsdijk et al teaches that the crack could then be located within the network of frangible conductors. Thus, the leak detection method disclosed by Van Riemsdijk et al depends on a physical break in the network being caused by the crack's forming in the lining, and does not contemplate a change in the network's electrical properties as a function of contact between the network and liquid leaking from the lined container.

Moreover, the method of Van Riemsdijk et al is intended for use in detecting leaks in liners of rigid containers, and therefore could not be employed advantageously in situations where substantial liner flexibility would be required. For example, the ground beneath earthen storage reservoirs and buried pipelines may shift as much as six to eight inches, upwards or downwards, as the soil alternatively settles or becomes saturated. Consequently, the leak detection method taught by Van Riemsdijk et al, which utilizes a frangible conductive network, could not be applied in practice to chemical storage and transportation that are subject to movement caused by shifting soil.

SUMMARY OF THE INVENTION

In accordance with the present invention, an electrically conductive wire network is placed directly beneath a chemical-containing reservoir or conduit, and changes in the electrical properties of each wire in the network caused by leaks from the reservoir or conduit are detected and the exact location of the leak determined by monitoring any change, for example, in electrical resistance or conductance, in each wire of the network. In one embodiment of the invention, the entire wire network is woven or otherwise incorporated into a geotextile fabric.

It is an object of the present invention to provide a method and a system for detecting leaks from chemical storage ponds, tanks and conduits soon after they occur.

Another object of the present invention is to provide a system which is not only capable of detecting the leak, but of pinpointing its location so that it can be quickly and conveniently repaired.

Still another object of the present invention is to provide a system and method for detecting and monitoring the progress of leaks from chemical reservoirs when they occur.

A further object of this invention is to provide a geotextile fabric having woven therein an electrically conductive wire network capable of detecting, locating and monitoring leaks from chemical reservoirs and conduits.

Still a further object of this invention is to provide a system which is capable of detecting leaks of non-corrosive and electrically non-conductive liquids, including many organic solvents and petroleum products.

DETAILED DESCRIPTION OF THE INVENTION

Figure 1:
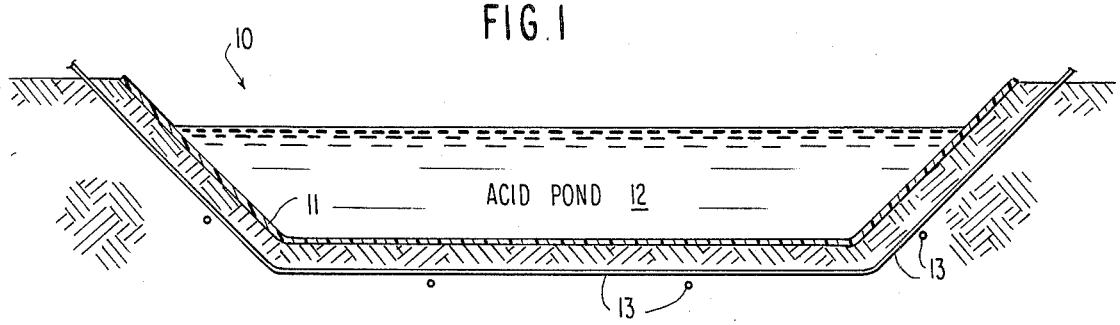
FIG. 1 is a side view of a waste disposal pond containing a leak detection system in accordance with the present invention.

The present invention is applicable to, e.g., settling basins, storage basins and tanks, solar ponds, or holding areas for waste streams, as well as to pipelines and other conduit systems. With reference to the drawings, and more particularly to FIG. 1, a waste disposal pond 10 is shown filled with a liquid chemical waste 12. The pond is formed by lining an excavated area with an extensive synthetic polymer lining 11.

Figure 2:
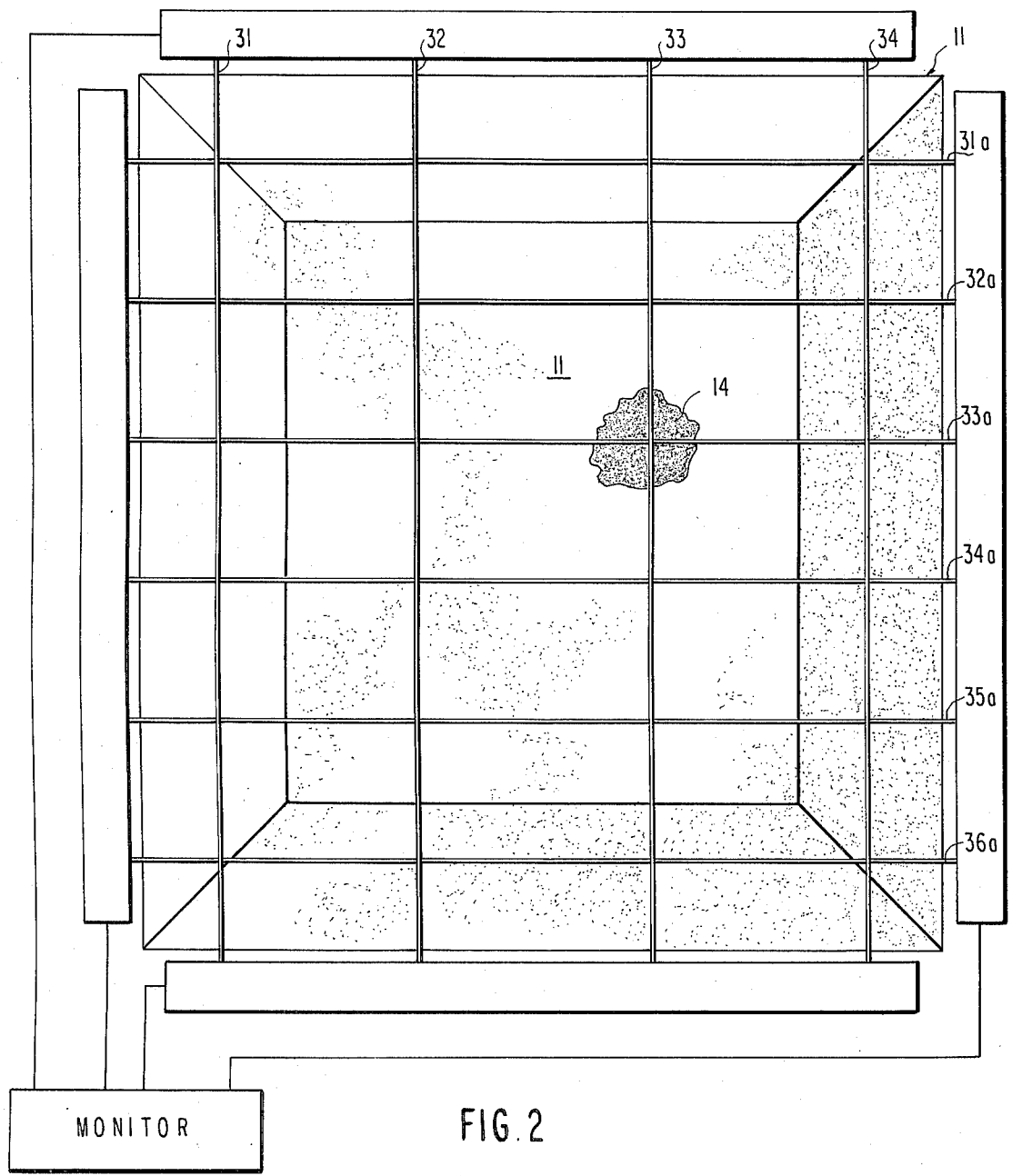
FIG. 2 shows a detailed view of the leak detection system of the present invention from the bottom of the pond in FIG. 1.

In constructing the leak detection system of the present invention, a wire network is positioned beneath the reservoir or conduit in the vicinity of where leaks are likely to occur. For example, chemical reservoirs formed by lining an excavated area with an extensive polymer lining in the past have been constructed with a bed of sand under the liner which prevents puncture and transmits any leakage to a location at the periphery of the reservoir where it can be collected. In accordance with one embodiment of this invention, a network comprising two sets of parallel wires is placed in such a sand bed so that the sets of wires are separated from each other by a layer of sand. The wires of one set cross the wires of the other at predictable angles and in a prescribed geometric pattern, e.g., at right angles to form a grid pattern as shown in FIG. 2.

A lining composed of a so-called "geotextile fabric" may be used in place of the sand bed. As described by R. M. Koerner and J. P. Welsh, CONSTRUCTION AND GEOTECHNICAL ENGINEERING USING SYNTHETIC FABRICS (1980), the contents of which are incorporated herein by reference, geotextiles are blankets of woven and non-woven fiber materials that are generally formed from polymers such as polyesters and nylons. Situated beneath the plastic liner, these fabrics function much the same way as a sand bed, preventing puncture and draining leakage to a peripheral location for collection. A geotextile fabric can be manufactured to incorporate the wire network, for example by replacing selected spools of the yarn forming the fabric with spools of the network wire. The wires can be separated from one another at the points of intersection by a layer of fabric. Geotextile fabrics are porous enough that when leaks occur a change in the electrical properties of the wires will result.

Accordingly, in another embodiment of the present invention an entire wire network like that described above is woven into a pad of geotextile fabric with the criss-crossing sets of wires separated from each other by fabric within the pad. Since specific wires in the network may be corroded if a leak in the pad occurs, each wire in the network can be connected at both of its ends to separate winding spools or similar devices positioned at the edge of the pad which would permit one to draw the length of wire through the pad, thereby replacing the corroded portion of the wire with new conductor.

Alternatively, wires in the network would pass through a plastic, fabric or other adequately flexible liner, or through a layer of sand, by way of tubes in the liner or sand layer composed of a material sufficiently porous to permit leaking fluid to come into contact with the wire or group of wires within. Exemplary suitable materials for such tubes are the ceramic compositions utilized in lysimeters, geotextile fibers, and perforated polyvinyl chloride plastics.

In a third embodiment, the corroded wires can be replaced after a leak has occurred and been repaired by splicing new conductor into the network to replace corroded wires. In this manner the system allows more rapid detection, location and monitoring of liner leaks than is currently available.

Embodiments of the invention are also envisioned in which the wires are adhered to the plastic liner forming the reservoir using a permeable adhesive composition or tape, or, when the liner is sufficiently thick, the wires are scored into the liner.

FIG. 2 is a detailed view of the leak detection system as seen from the bottom of the pond. In FIG. 2, the wire network comprises a metal wire grid 13 positioned directly beneath the liner 11. The illustrated wire grid consists of two criss-crossing sets of parallel wires. The first set of parallel wires comprises wires 31, 32, 33 and 34. The second set of parallel wires (31a, 32a, 33a, 34a, 35a and 36a) extends in a direction transverse to the first set of wires so that the two sets cross at predictable angles (here, 90°). The wires of the respective grids are separated from one another, either by soil, fabric or some other insulator, at the points of crossing, the latter being spaced under the pond so as to facilitate the detection and localization of the leak as now described.

With reference again to FIG. 2, the change in the resistance of wires 33 and 33a locates the leak in the vicinity of their crossing. Also, in accordance with the present invention it is possible to estimate the size of a leak and monitor its progression. For example, in its early stages a leak at 14 might be considered minor and a decision to repair it could be postponed until, for example, the resistances of wires 32a and 34a were also affected.

While FIG. 2 illustrates a grid arrangement, the skilled artisan can see that a number of suitable arrangements are possible. In another arrangement that might be used, one set of wires forms a series of concentric circles of successively decreasing diameters and another set extends radially and divides the circles into arcs.

In one embodiment of the invention, the wires are fabricated in a gauge and from a metal that will easily corrode when contacted with the chemicals stored in the reservoir directly above the detection system. Aluminum, copper and steel wires about 0.040 inch in diameter have been studied for use in the invention and it has been found that steel wire easily corrodes upon contact with the leakage from an acid pond, whereas an aluminum wire corrodes particularly quickly in the presence of an alkaline leakage such as sodium hydroxide. The system can be made more versatile by employing a combination of different wires. For example, a system employing steel and aluminum wires together could be used to detect leaks of either an acid or an alkaline liquid. The wires in one grid might be alternately acid-corrodable and alkali-corrodable. Alternatively, two grids could be superimposed, one above the other, one grid being acid-corrodable and the other grid alkali-corrodable.

In accordance with the present invention, leaks in the liner are instantly detected as a change in the electrical properties, e.g., the resistance, conductance or impedance, in each wire affected. With reference to FIG. 2, a leak at the point 14 would subject wires 33 and 33a to the corrosive action of the chemical in the reservoir, causing the resistance of wires 33 and 33a to change. In using the system, the electrical resistance or voltage across each wire in the network would be measured and recorded prior to introducing the waste chemicals or placing the sytem into operation. This is in sharp contrast to the technique disclosed by Berry, whereby the resistance between pairs of wires would be measured. Thus, with the method of Berry, the grid arrangement of criss-crossing sets of wires is a prerequisite to operability of the leak-detection system. In contrast, such a criss-crossing network is useful with (but not necessary to) the present invention, since the regular geometry of the network permits easy localization of the leak. However, a grid network need not be present for applicant's invention to operate as a leak-detector, which function may be fulfilled by a single wire in saturated soil.

Moreover, while the leak detection systems disclosed by Berry and Butts rely on a change in the electrical properties of the medium separating the conductors, the present invention is concerned with a change in the electrical properties of the conductors themselves. As a result, the present invention is not subject to problems that occur when the conductivity of the medium surrounding the conductors cannot be controlled.

As long as there is no leak in the liner, the resistance across the wires in the present invention remains fairly constant or is subject to only predictable and small consistent changes during the service life of the liner. Any natural deterioration in the wires such as due to soil moisture can also be monitored and offset using a small control grid set in the soil adjacent the reservoir.

When a leak occurs, the chemicals in the reservoir contact the wires in the grid directly beneath the leak, causing a noticeable change in electrical properties. The change may be caused by corrosion of the wires or, where the chemical waste itself is electrically conductive, result from contact of the waste with the wires. The change in electrical properties can easily be detected by a variety of conventional means and the exact location of the leak can be determined from the points of intersection of the wires in which a change in resistance is detected. One example of the variety of means for monitoring the voltage across the wires is a Model 2240 B Data Logger by Fluke Co., Tilburg, The Netherlands. In an extreme case, or when a very thin gauge wire is used, the wires can be corroded through producing a break in the circuit.

Figure 3:
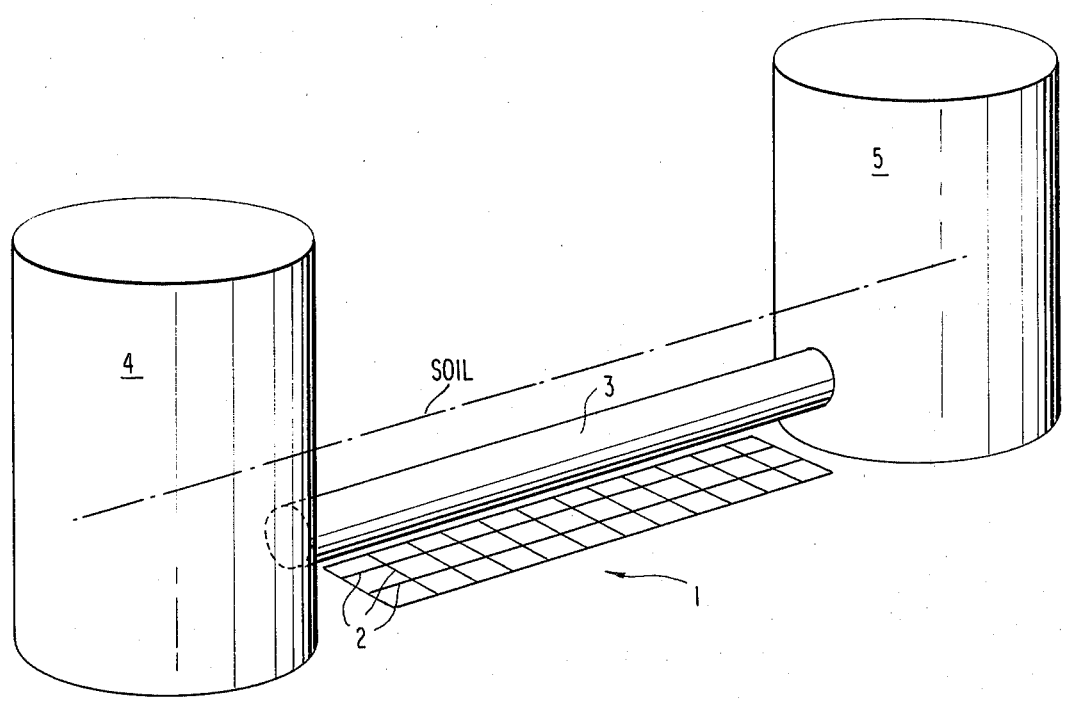
FIG. 3 shows an embodiment of the present invention used to detect breaks in a pipeline.

In another embodiment of the present invention, the leakage detection system described above is used in association with a pipeline or other type of conduit through which potential environmental pollutants are transported. An arrangement of this sort is shown in FIG. 3, where an orthogonal network (1) of wires (2) is deployed near a pipeline (3) connecting holding tanks (4) and (5), so that any leakage from the pipeline results in contact between the network and the chemical being transported through the pipeline. As a result of this contact, the electrical properties of one or more wires in the network are altered, which alteration is detected in each wire affected, thereby permitting the localization of the leakage, as described above.

The present invention also provides an embodiment whereby leaks in reservoirs and conduits containing substantially non-corrosive and non-conductive materials can be detected. Leaks from reservoirs and conduits containing many organic solvents and petroleum products cannot be detected using a simple matrix of uninsulated wires, as described above, because the leaking fluids do not corrode or otherwise affect the conductive properties of the wires. In accordance with another embodiment of the present invention, however, the wires used in the system are coated with a material which can be dissolved or otherwise degraded by the chemicals in the reservoir or conduit. In this case, when a leak occurs, the coating is degraded or removed to such an extent that a change in the electrical properties of each affected wire is detected. Accordingly, a first set of parallel wires might be coated with, for example, a gum rubber which is degradable by one organic solvent, while the second criss-crossing set of parallel wires would also be coated with the degradable gum rubber. With leakage of the organic solvent, the gum rubber would be attacked by the solvent and degraged to the extent that a change in the conductivity of the partially or fully uncoated wires affected would occur.

Alternatively, multiple separate pairs of criss-crossing sets of wires could be employed in a single system, each pair (or each set within a pair) having wires coated with an insulation susceptible to attack by a different non-conducting fluid. With this embodiment, leaks from a reservoir or conduit carrying different fluids at different times could be detected.

While the invention has been described in detail and with reference to specific embodiments thereof, it will be apparent to one skilled in the art that various changes and modifications can be made therein without departing from the spirit and scope thereof.

What is claimed is:

1. A system for detecting leaks from liquid containment means such as a reservoir or conduit, said system comprising:
    a geotextile fabric;
    a detection network of a plurality of conductive members incorporated into said geotextile fabric, said conductive members being electrically insulated from one another and crossing one another at predictable locations, each said conductive member including a material which is selected to be degradable by the particular liquid to be detected; and
    monitoring means connectable to each of said conductive members for separately monitoring at least one electrical property of individual ones of said conductive members and for detecting a change in said electrical property which occurs as a result of degradation of said material by said liquid to be detected.

2. The leak detection system of claim 1, wherein said containment means is a waste chemical disposal pond.

3. The leak detection system of claim 1, wherein said containment means is a chemical waste tank.

4. The leak detection system of claim 1, wherein said containment means is a pipeline.

5. The leak detection system of claim 1, wherein said detection network of electrically conductive members comprises a grid of at least two sets of parallel electrically conductive detection wires, which sets are separated from each other and which criss-cross one another at predictable angles.

6. The leak detection system of claim 1, wherein degradation by said liquid reduces the conducting cross-section of said conductive members and said monitoring means detects an increase in the resistance of said conductive members.

7. The leak detection system of claim 1, wherein each conductive member in said detection network is a continuous wire which passes through geotextile fabric and which is capable of being drawn through said geotextile fabric.

8. The leak detection system of claim 1, wherein each conductive member in said detection network is a detection wire coated with said material.

9. The system of claim 8, wherein said detection network comprises at least two electrically isolated sets of electrically conductive detection wires, each of which sets comprises at least one wire coated with a material which is dissolved or degraded by a chemical substance different from the chemical substance or substances capable of dissolving or degrading the coating on wires in at least one other set in said network.

10. A method for detecting leaks from liquid containment means such as a reservoir or conduit, said method comprising:
    placing in the vicinity of said liquid containment means a geotextile fabric having incorporated therein a detection network of a plurality of conductive members, said conductive members being electrically insulated from one another and crossing one another at predictable locations, each said conductive member including a material which is selected to be degradable by the particular liquid to be detected; and
    separately monitoring at least one electrical property of individual ones of said conductive members and detecting a change in said electrical property which occurs as a result of degradation of said material by said liquid to be detected.

11. The method of claim 10, wherein said detection network comprises a grid of two sets of parallel electrically conductive detection wires which are separated from each other and criss-cross one other at predictable angles.

12. The method of claim 10, wherein said liquid containment means contains waste chemicals.

13. The method of claim 10, wherein said liquid containment means is a waste disposal pond.

14. The method of claim 10, wherein said liquid containment means is a pipeline.

15. The method of claim 10, wherein degradation by said liquid reduces the conducting cross-section of said conductive member and said monitoring and detecting step comprises detecting an increase in the resistance of said conductive member.

16. The method of claim 10, wherein said conductive members comprise wires which are coated with said material.

17. The method of claim 10, wherein said detection network comprises at least two electrically isolated sets of electrically conductive detection wires, each of which sets comprises at least one wire coated with a material which is dissolved or degraded by a chemical substance different from the chemical substance or substances capable of dissolving or degrading the coating on wires in at least one other set in said detection network.

18. A system for detecting leaks from liquid containment means such as reservoirs or conduits, said system comprising a liner, a layer of sand beneath said liner, a plurality of tubes passing through said layer of sand and composed of a suitably porous material, a detection network of a plurality of conductive members passing through said tubes, said tubes crossing one another at predictable locations, each said conductive member including a material which is selected to be degradable by the particular liquid to be detected, and monitoring means connectable to each of said conductive members for separately monitoring at least one electrical property of individual ones of said conductive members and for detecting a change in said electrical property which occurs as a result of degradation of said material by said liquid to be detected.

* * * * *